Figure 1:
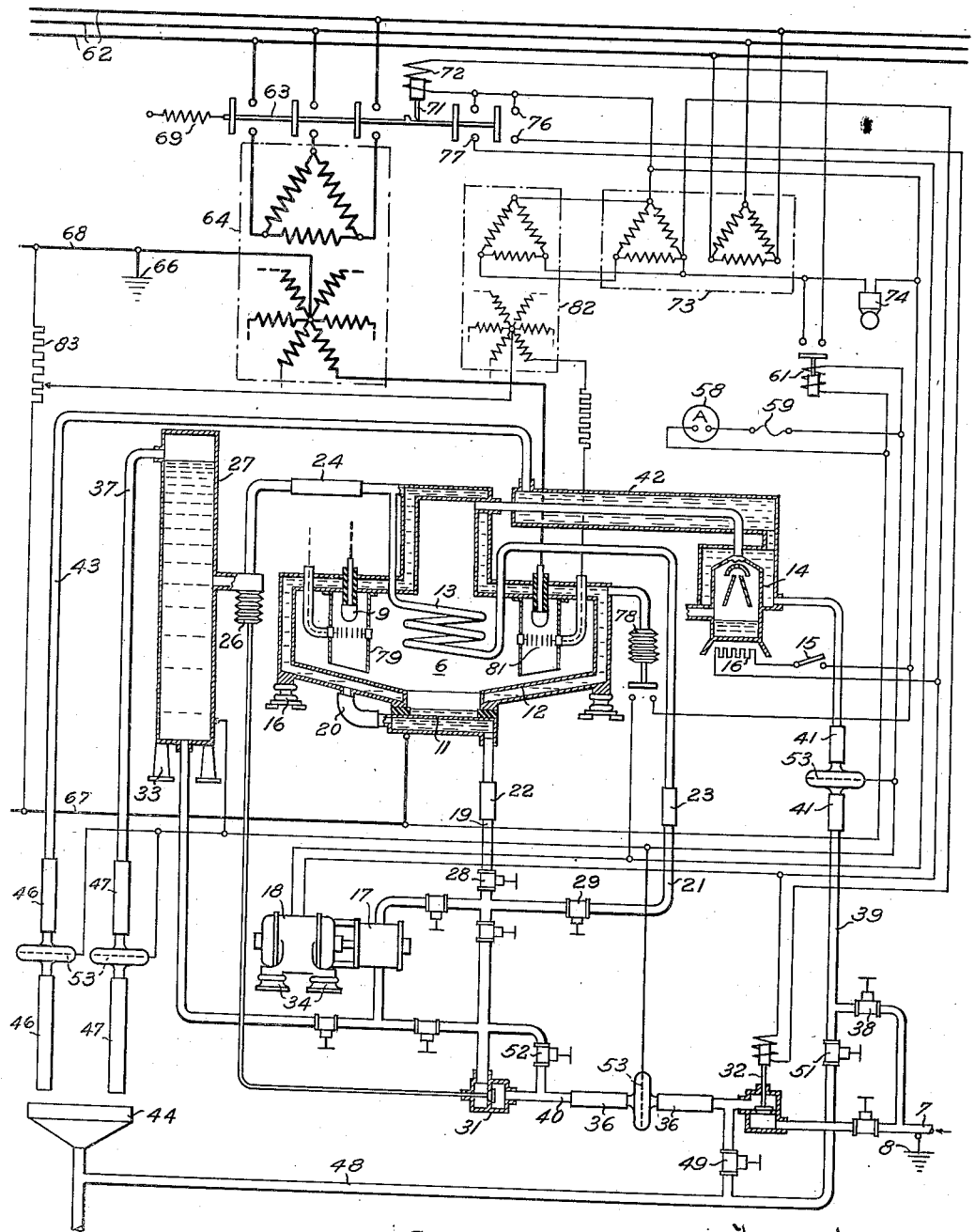

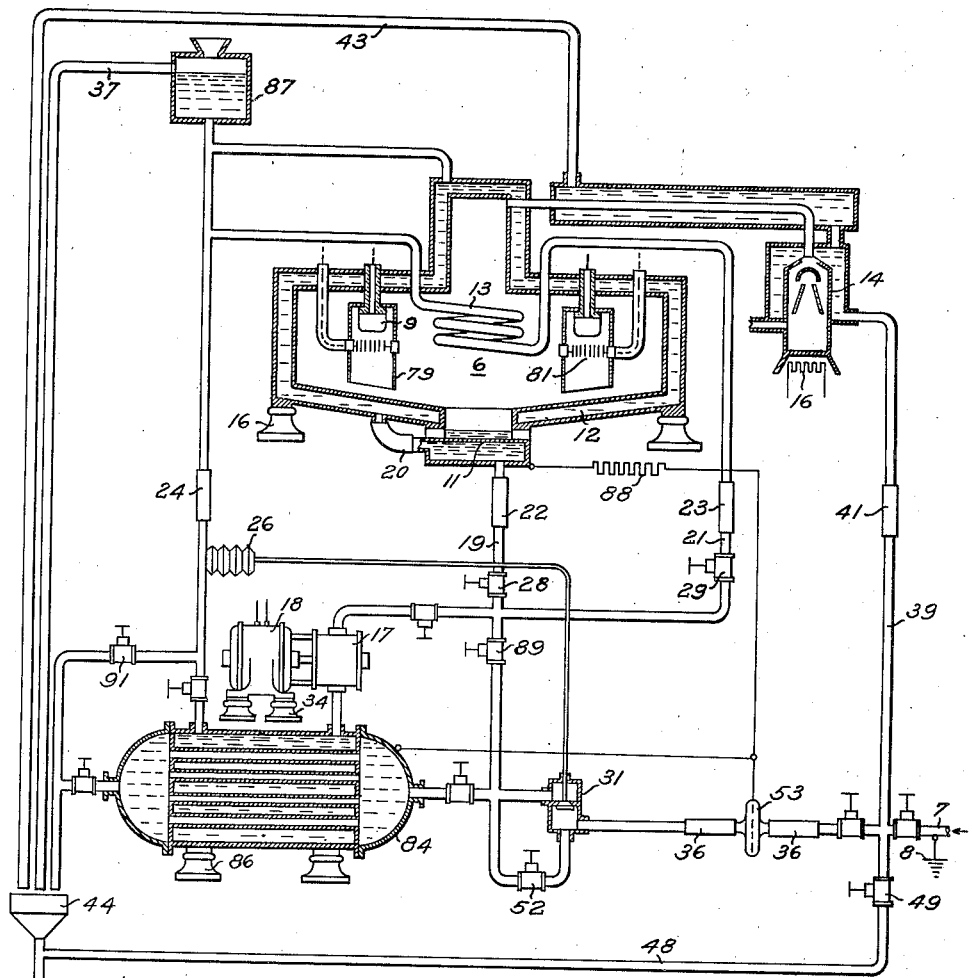
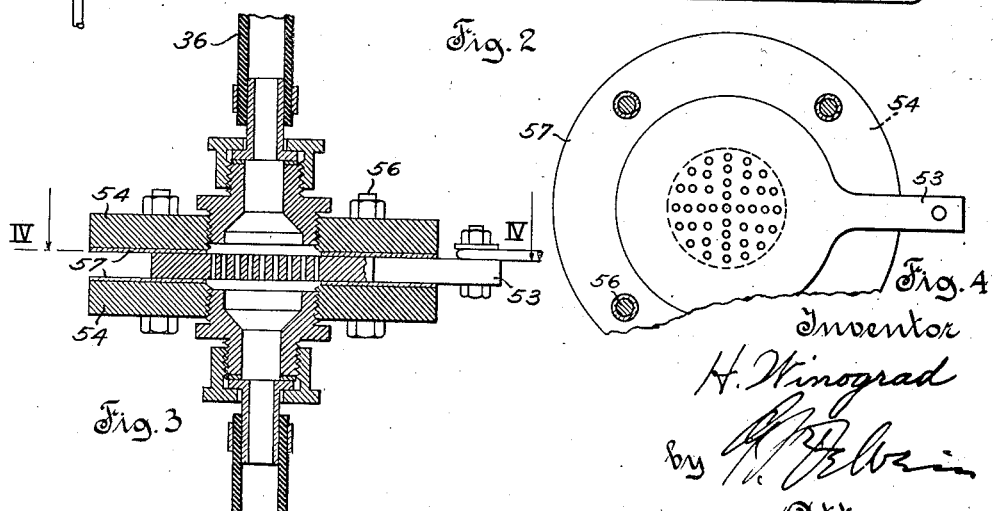

Patented June 22, 1937

2,084,545

UNITED STATES PATENT OFFICE 2,084,545

ELECTRIC VALVE PROTECTIVE SYSTEM

Harold Winograd, Milwaukee, Wis., assignor to Allis-Chalmers Manufacturing Company, Milwaukee, Wis., a corporation of Delaware Application February 4, 1935, Serial No. 4,829

20 Claims. (Cl. 175—363)

This invention relates in general to protective systems for electric devices, and more particularly to means for preventing electrolytic corrosion in devices, such as an electric valve, connected with a source of cooling or heating fluid.

In the electrical art, use is frequently made of devices at one potential, which are to be connected with a source of cooling or heating fluid at another potential, the fluid from the source circulating through the device or being brought into heat exchanging relation with another fluid circulating through the device of which the temperature is to be controlled. In general, the fluid utilized is water having a material electrical conductivity and which is electrolyzed by the flow of leakage current therethrough, thereby causing corrosion of the conduits through which the water is flowing, which conduits are usually made of steel. In addition, a plurality of members, such as the casing and the cathode of an electric valve, may be connected with the source, with the result that leakage currents may disturb the relative potentials of such members and thereby affect the operation of the valve. Such disadvantages are obviated by connecting the conduits of the device with water conduits at different potentials through insulating conduits, and by providing means for controlling the flow of leakage current between such conduits. It will be understood that the means contemplated may also be used for controlling corrosion of conduits not associated with electrical apparatus but nevertheless subject to differences of potential, such as underground water mains lying in the path of grounded power circuits.

It is, therefore, one of the objects of the present invention to provide insulating means for cooperating fluid-carrying conduits at different potentials, by which electrolytic corrosion of such conduits may be controlled.

Another object of the present invention is to provide insulating means for cooperating fluid-carrying conduits at different potentials by which the flow of leakage currents between the conduits may be controlled.

Another object of the present invention is to provide insulating means for cooperating fluid-carrying conduits at different potentials by which the relative potentials of such conduits may be regulated.

Another object of the present invention is to provide insulating means for cooperating fluid-carrying conduits at different potentials by which the operation of an electrical device connected with the conduits may be relieved of the disturbing effect of the leakage current therebetween.

Objects and advantages other than those above described will be apparent from the following description when read in connection with the accompanying drawings, in which:

Fig. 1 diagrammatically illustrates one embodiment of the present invention applied to the cooling system of an electric valve of the metallic casing type, arranged to be cooled by tap water mixed with water having already circulated through the conduits of the valve;

Fig. 2 diagrammatically illustrates, with the exception of the associated electric circuits, a modified embodiment of the present invention differing from the embodiment illustrated in Fig. 1 in that the water flowing through the passages of the valve may be entirely separated from the fresh water by means of a heat exchanger;

Fig. 3 is an enlarged cross-sectional view of a portion of one of the conduits utilized in the embodiment illustrated in Figs. 1 and 2; and Fig. 4 is a portion of a cross-section taken on the line IV—IV in Fig. 3.

It will be understood that elements shown in any one of the figures may be utilized in combination with elements of the other figures, if such combination is found to be advantageous.

Referring more particularly to the drawings by characters of reference, reference numeral 6 generally designates an electrical device, in the present instance an electric valve, of which the temperature is to be regulated by means of a fluid such as tap water supplied thereto from a suitable source, such as a distribution system represented by a conduit 7. In general, the water supplied through conduit 7 is at a temperature lower than the temperature of the walls of valve 6 and therefore serves for cooling such walls, but it may sometimes be necessary to heat the walls of valve 6, the source then being such as to be capable of supplying water of a higher temperature. In general, conduit 7 is constituted of metallic and hence conductive piping, connected with ground as at 8 and therefore maintained at ground potential.

Valve 6 is provided with a plurality of electrodes such as anodes 9 and cathode 11 arranged to penetrate in insulating and gas-tight relation through the casing 12 of the valve. The valve is provided with one or more conduits for the flow of cooling water therethrough, such designation of conduits applying to any member of the valve adapted to receive temperature regulating fluid. Such conduits include the casing 12, which is accordingly provided with a double wall, cathode 11 which likewise comprises a double walled element, and a cooling coil 13 in conductive relation with casing 12. In general, such conduits are of corrodible conductive material, steel being most frequently utilized in their manufacture. The conduits also include the walls of a pump 14 of the vapor condensation type which is generally provided for exhausting the space within casing 12, a flow of cooling fluid being required for causing the condensation of mercury vaporized within the pump by a heater 16. Pump 14 is generally supported on casing 12 which in turn rests on insulators 16, insulating it from ground.

For controlling the temperature of the different members of valve 6, water is forced through cathode 11, casing 12 and pipe 13 by a pump 17 driven by a motor 18, the pump being connected with the passages of valve 6 through pipes 19 and 21 and through insulating conduits 22 and 23. The water leaving the passages defined by the conduits of valve 6 flows through an insulating conduit 24, comes in contact with a thermostatic element 26, and flows into a tank 27 from which it returns to pump 17. The relative amounts of water flowing through casing 12 and cooling coil 13 may be adjusted by means of valves 28 and 29. The thermostatic element 26 controls a valve 31 controlling the admission of fresh water from pipe 7 to the circuit of pump 17, the connection between pipe 7 and valve 31 preferably also including a magnet valve 32. Tank 27, pump 17 and the pipes connected therewith and at least partly supported thereby are preferably insulated from ground by means of insulators 33 supporting tank 27, insulators 34 supporting motor 18, and any other insulators that may be necessary. Valve 31 is then connected with valve 32 through an insulating conduit 36.

The water supplied by pipe 7 to the circuit of pump 17 leaves such circuit through an overflow pipe 37 of tank 27. Water is also supplied from pipe 7 to pump 14, such water flowing through a valve 38, a pipe 39 and an insulating conduit 41, and leaving the pump through a conduit surrounding the pipe connecting pump 14 with the space within casing 12, and therefrom through a pipe 43. Pipes 37 and 43 lead to a drain 44 which is generally at ground potential. Such pipes are insulated from the drain by causing the water issuing therefrom to flow through insulating conduits 46 and 47 and to then fall freely into the drain. The entire system may be drained through pipe 48 by means of valves 49 and 51. Valve 31 is preferably connected in parallel with a bypass valve 52.

Each of insulating conduits 36, 41, 46 and 47 is provided with an electrode 53 penetrating thereinto to come into intimate contact with the water within the conduit. Each electrode 53, see Fig. 3, is preferably made in the form of a plate of conductive material, which may be either a corrodible material or a non-corrodible material, a few of the materials suitable for such electrodes being iron, stainless steel, carbon in the amorphous or in the graphitic state, and carborundum.

For conveniently inserting electrode 53 in the associated conduit, such as pipe 36, the electrode is preferably given the shape shown in Figs. 3 and 4, and the conduit preferably comprises a pair of metal flange members 54 assembled by bolts 56 and clamping the electrode 53 between insulating gaskets 57. Plate 53 thus extends completely across the passage through pipe 36 and is provided with a plurality of canals through which the water may flow in intimate contact with the electrode without encountering excessive hydrodynamic resistance. The several electrodes 53, tank 27 and the piping conductively connected therewith are connected with one of the members of valve 6, preferably cathode 11, through a circuit comprising suitable impedance elements, and which may also comprise indicating and controlling elements. In the present embodiment such circuit comprises the coil of an ammeter 58, a fuse 59, the fuse and the ammeter being shunted by the coil of a relay 61.

The electrical circuits associated with valve 6 are only illustrated by way of example, it being assumed that valve 6 is operable to rectify alternating current supplied thereto from an alternating current supply line 62 connected with the anodes 9 of the valve through a circuit breaker 63 and a transformer 64. The direct current output line of valve 6 comprises a positive conductor 67 connected with cathode 11 and a negative conductor 68 connected with transformer 64. In general, conductor 68 is grounded as at 66. Circuit breaker 63 may be closed against the action of a spring 69, and is then maintained closed by a latch 71 which may be withdrawn by means of a trip coil 72. The trip coil may be energized from any suitable source, such as a transformer 73 energized from line 62, the circuit therebetween being completed through contacts of relay 61 to cause opening of the circuit breaker. Closure of the contacts of relay 61 also causes operation of an alarm signal such as a bell 74. The coil of magnet valve 32 may also be energized from transformer 73 through contacts 76 of circuit breaker 63. Motor 18 may be energized from transformer 73 through contacts 77 of circuit breaker 63, and also through the contacts of a thermostat 78 operating in response to the variations of temperature of water having circulated through at least a portion of the conduits of valve 6. Heater 16 is connected with transformer 73 through a switch 15.

The discharge between each anode 9 and cathode 11 is preferably guided by a discharge guide 79, which may constitute a portion of casing 12 or, as shown in Fig. 1, may be mounted on casing 12 in conductive relation therewith. Each discharge guide preferably encloses one or more grids such as 81, which may be unenergized, being then connected with or insulated from the associated guide, or which may be energized by suitable means such as a transformer 82 energized from transformer 73. The secondary winding of transformer 82 is preferably provided with a neutral point connected with the intermediate tap of a voltage divider 83 connected between conductors 67 and 68. Cathode 11 is brought to the current conductive condition and is maintained in such condition by suitable means, which are well known in the art and therefore not shown.

To put valve 6 in operation, cathode 11 is brought to conductive condition in a well known manner, circuit breaker 63 is closed to connect transformer 64 with line 62, and switch 15 is closed to energize heater 16 from transformer 73 and thereby cause operation of pump 14. Valve 6 then supplies rectified current to line 67, 68, as is well known in the art, cathode 11 then being brought to a positive potential with respect to the potential of conductor 67 and of ground. Closure of circuit breaker 63 causes closure of contacts 76, whereby the coil of magnet valve 32 is energized to open the valve, and also closes contacts 77 to connect motor 18 with transformer 73. Motor 18 then drives pump 17 to cause a flow of water to circulate through pipes 19 and 22 and casing 12 is parallel with pipes 21, 23 and cooling coil 13, the entire flow of water thereafter passing through pipe 24 and tank 27 back to pump 17. In tank 27, the water comes in contact with the atmosphere, and therefore absorbs oxygen which causes corrosion of the walls of the metallic conduits within which it is retained. Such action may be retarded by so dimensioning tank 27 that the contact area between the water and atmosphere is reduced to the greatest practical extent, and the water is also preferably conducted to tank 27 at a point a material distance below the surface of the water, thereby leaving the oxygen-laden water within the upper portion of tank 27 substantially undisturbed. During continuous operation of valve 6, the circulation of water by pump 17 between valve 6 and tank 27 may be sufficient to maintain the temperature of the water within the desired limits. If the temperature of the water increases beyond the limits for which thermostat 26 is adjusted, such thermostat causes valve 31 to open. Fresh water is thus admitted from pipe 7 through valve 32, conduit 36, and valve 31 into the closed circuit of pump 17, water equal in amount to the water admitted then leaving tank 27 through overflow pipe 37. The amount of water so admitted is regulated by thermostat 26 to maintain the temperature of the water adjacent the thermostat at substantially uniform value regardless of the value of the load of valve 6.

It will be observed that as cathode 11 is at a positive potential with respect to ground, a difference of potential is impressed between cathode 11, casing 12, and tank 27 on the one hand, and conduit 7 and drain 44 on the other hand. It is, therefore, necessary to insulate cathode 11 and casing 12 against conduit 7, such insulation being obtained by the insertion of insulating conduits 36, 41, 22 and 23 in the connection therebetween, valve 6 and tank 27 being insulated from drain 44 by means of insulating conduits 46 and 47 and by the gap between such conduits and the drain.

It will be understood that the insulation obtained as explained above is not perfect, because the water flowing through the different insulating conduits has a material conductivity resulting from the presence of electrolytes in solution therein, so that leakage currents flow continually through the water contained within the insulating conduits. Under the conditions usually encountered in practice, however, the concentration of the electrolytes in the cooling water is within such a range that valve 6 remains insulated from ground to a substantial degree, in that the desired voltage can be maintained between conductor 67 and ground and that the leakage currents flowing through the water, and which result in a loss of energy, are of such reduced magnitude as not to materially affect the economy of the device. Such currents, however, cause electrolysis of the water, which is decomposed into hydrogen and oxygen, and of the electrolytes in solution therein, which are decomposed into their component anions and cations. The hydrogen and the cations are liberated at the surfaces of the conductive conduits at the grounded end of each of the insulating conduits 36 and 41, and at drain 44, and are of such nature as to have no detrimental effect on the useful life of such conduits or on the operation of the valve. In the absence of electrodes 53, however, the oxygen and the anions would be liberated at the surfaces of the ungrounded conductive conduits adjacent the insulating conduits, and would rapidly corrode such surfaces, as was frequently observed in actual practice. Such corrosion frequently extends over a considerable length of the conduits, and may even extend to the conduits of the valve itself, the replacement of which is always a difficult, lengthy, and expensive operation.

Electrodes 53 being arranged as shown in the drawings, if such electrodes are made of corrodible material, they are gradually corroded and are easily replaced at suitable time intervals with fresh electrodes. If the electrodes are of corrosion resisting material, the oxygen and the anions liberated thereon are dissolved in the cooling water. While oxygen and the similarly acting anions are highly corrosive when appearing in the nascent state on the electrodes, their corrosive effect is lessened to a considerable degree after their solution in water, so that they may be permitted to entrain in the flow of water, provided the conduits of the system are reasonably well protected against their action by a coating of corrosion-inhibiting material. The leakage current of all electrodes 53 flows substantially entirely from cathode 11 to the electrodes through ammeter 58, which indicates the magnitude thereof. If such leakage current becomes excessive magnitude, as the result of accidental grounding of an electrode of the piping conductively connected therewith, or as the result of the accidental presence of an excess of electrolytes in the cooling water, relay 61 closes the contacts thereof. Such action is accelerated if the flow of leakage current is of sufficient magnitude to cause fuse 59 to operate, thereby causing all of the leakage current to then flow through the coil of the relay. Closure of the contacts of relay 61 causes operation of bell 74 and opening of circuit breaker 63, to thereby cause termination of the disturbance and permit ascertaining the cause thereof.

Casing 12 and cathode 11 are in different conductive relations with the electrical circuits of valve 6, and are therefore normally at slightly different potentials, the potential of casing 12 being somewhat higher than the potential of cathode 11. A direct conductive connection between such members is therefore avoided by insertion of insulating conduits 20, 22, 23 and 24 in the cooling circuit. It might then appear more advantageous to omit the insulation of tank 27 and pump 17 to ground and avoid the complication resulting therefrom, and to instead provide insulating conduits 22, 23 and 24 with leakage electrodes 53. Such procedure, however, would substitute conduits 22, 23 and 24 for conduits 36 and 47 for the insulation of valve 6 to ground, thus adding one more path to the flow of leakage current. In addition, conduits 22, 23 and 24 are generally of larger cross section than conduits 36 and 47 to reduce the energy required by pump 17 for circulating water therethrough; such water is also at higher temperature and contains a larger amount of impurities than the fresh water flowing through conduit 36, and is therefore more conductive than the fresh water. For all these reasons, the leakage currents would thus be materially increased, thereby increasing the wear of the electrodes 53 and the amount of free oxygen released into the water. The leakage current could then be maintained within the permissible limits by lengthening conduits 22, 23 and 24, but such lengthening would generally need to be considerable. The path of the circulating water would then be lengthened to an extent such that the size of pump 17 and of motor 18 would have to be considerably increased, thereby causing consumption of additional amounts of energy for the operation thereof.

In the present embodiment, it is assumed that the operation of valve 6 is materially affected by the potential of guides 79 conductively connected with casing 12 to the extent that, for example, even if cathode 11 is in conductive condition, the flow of current between anodes 9 and the cathode cannot be established when the casing is at a negative potential with respect to the cathode. The potential of the casing with respect to the cathode is generally positive as the result of transfer to the casing of positive charges of the ionized vapor therein, in excess of the number of negative charges of electrons impinging thereon.

In the absence of electrodes 53 in conduits 41 and 46, a leakage current would be established between casing 12 and conduit 7 through pump 14, the water within conduit 41, and conduit 39 and also through pipe 43. If the conductivity of the water was sufficiently high, such leakage current might then be sufficient to remove the positive charges from casing 12 at such a rate that the casing would become negative with respect to the cathode, so that the operation of anodes 9 could not be initiated. As a result of the presence of electrodes 53 in conduits 41 and 46, however, such leakage current is supplied from cathode 11 through the low resistance path provided by ammeter 58 and fuse 59, so that the potential of casing 12 cannot drop below the potential of cathode 11 irrespective of the magnitude of the leakage current, and the normal operation of valve 6 is thereby assured. Omission of the electrode of conduit 47 and of the conductive connection between tank 27 and cathode 11 would also cause the potential of casing 12 to become less positive and to eventually become lower than that of cathode 11. Pipe 40 connecting conduit 36 with valve 31 is conductively connected with the electrode of conduit 36 through the conductive connection of tank 27 with such electrode. The portion of conduit 36 between the associated electrode and pipe 40 could therefore be omitted. The associated flanges 54 would then be conductively connected with pipe 40, and current would flow from flanges 54 as well as from electrode 53 to ground, thereby causing undesired corrosion of the flanges. It is therefore preferable to retain electrode 53 at an intermediate point of the length of conduit 36.

In the embodiment partially illustrated in Fig. 2, the closed circuit of pump 17 does not include a mixing tank but comprises instead the casing of a heat exchanger 84 insulated from ground by means of insulators 86. As in the embodiment illustrated in Fig. 1, when the load of valve 6 is such that the temperature of the water in contact with thermostat 26 is below a predetermined limit, the water recirculated by pump 17 is simply cooled by the ambient atmosphere, the variations of the volume of the water resulting from the temperature variations thereof being freely permitted by means of an expansion tank 87 connected with drain pipe 37. If the temperature of the water increases beyond such limit, valve 31 admits fresh water from conduit 7 through conduit 36 into the tubes of heat exchanger 84, from which the water is discharged to drain 44, the amount of water thus admitted being regulated to maintain the temperature of the water in contact with thermostat 26 at a substantially constant value.

Conduit 36 is provided with an electrode 53 which may be connected with cathode 11 simply through a resistor 68 of low resistance relative to the resistance of the water within conduits 22, 23 and 24. If pump 17 should become temporarily unavailable, valve 6 may be cooled directly by the flow of water from conduit 7 through conduit 36, valve 31, and auxiliary valve 89, conduits 19 and 21, the conduits of valve 6, conduit 24 and an outlet valve 91. Valve 92 bypassing valve 31 is then opened to admit a slight amount of water in the system even when valve 31 is completely closed and thereby causes thermostat 26 to be continually responsive to the temperature of the walls of valve 6.

In general, valve 89 is closed and the water admitted from conduit 7 remains entirely separated from the water circulated by pump 17. Under such conditions, the recirculating water may receive suitable additions for the purpose of inhibiting corrosion of the conduits of the circuit under the action of atmospheric oxygen dissolved into the water by contact at the surface thereof. Such additions may consist of materials such as an alkaline chromate or an alkaline bichromate which renders the conductivity of the water comparatively high. As the difference of potential between casing 12 and cathode 11 is comparatively small, the leakage current resulting therefrom through pipes 22, 23, 24 and 17 will generally not reach a detrimental value, even when the conductivity of the water becomes comparatively high. In any event the potential of casing 12 will not drop below the potential of cathode 11, so that the operation of valve 6 will not be affected thereby. In the present embodiment, guides 79 are shown as being insulated from casing 12 so that the potential of the casing is, to some extent, immaterial to proper operation of valve 6, and electrode 53 of conduit 41 may then be omitted. The insulating conduits 46 and 47 shown in Fig. 1 may likewise be omitted and all live drain pipes may be insulated from drain 44 only by the gap therebetween. As oxygen resulting from electrolysis of the water flowing through such gap is liberated at the end of the drain pipes and does not flow through the cooling circuit, corrosion is limited to the end of the drain pipes, which are easily replaceable, and the effect of such corrosion is therefore comparatively unimportant. Heat exchanger 84 is preferably conductively connected with cathode 11. The leakage current flowing from the heat exchanger outlet to the drain through the water column therebetween, then flows from cathode 11 through resistor 88 and the casing of the heat exchanger. In the absence of such conductive connection, such leakage current would flow from cathode 11 through conduit 22 and from casing 12 through conduits 23 and 24 to the heat exchanger, thereby causing corrosion of the associated pipes and liberation of free oxygen in the water. As the water in such pipes is generally recirculated without replacement, the oxygen content thereof would become excessive and would cause accelerated corrosion of the entire recirculating circuit. It is also one of the purposes of electrode 53 to divert, from the water in conduits 22, 23 and 24, the leakage current flowing through the water in conduit 36 to ground. The recirculating circuit is thus entirely free of the direct or indirect effects of electrolysis.

Although but two embodiments of the present invention have been illustrated and described, it will be apparent to those skilled in the art that various changes and modifications may be made therein without departing from the spirit of the invention or from the scope of the appended claims.

It is claimed and desired to secure by Letters Patent:

1. In combination, an electrical device having a conductive conduit at one potential, a second conductive conduit at another potential, an insulating conduit connecting the first and second said conduits for the flow of fluid therebetween, an electrode penetrating into said insulating conduit at a point intermediate the length thereof, means for controlling the operation of said device, and means connected between said electrode and the first said conduit for controlling the operation of the first said means.

2. In combination, an electric circuit comprising a device having a conductive member and a conductive conduit in different conductive relations with the circuit, a second conductive conduit at a potential different from the potentials of the first said conduit and of said member, an insulating conduit for connecting the first and second said conduits for the flow of a materially conductive fluid therebetween, an electrode within said insulating conduit at a point intermediate the length thereof, and means for conductively connecting said electrode with said member, to thereby substantially prevent the flow of leakage current between said conductive conduits by way of said fluid.

3. In combination, an electrical device having a conductive member and a conductive conduit in different conductive relations with the circuit of said device, a second conductive conduit at a potential different from the potentials of the first said conduit and of said member, an insulating conduit for connecting the first and second said conduits for the flow of a materially conductive fluid therebetween, and circuit means connected with said member and with said conduits to adjust the relative potentials of said conduits and of said member.

4. In combination, an electric valve having a cathode and having a conductive casing insulated from said cathode and constituting a conduit for the flow of cooling fluid, a second conductive conduit at a potential lower than the potential of said cathode, an insulating conduit for connecting said casing with the second said conduit, a fluid of materially electrical conductivity in said conduits, and means for causing said casing to be maintained at a positive potential relative to the potential of said cathode during operation of said valve.

5. In combination, an electrical device having a conductive conduit at one potential and at one temperature, a source of fluid at another potential and at another temperature, a heat exchange device having distinct passages severally connected with said conduit and with said source, and means for causing said heat exchange device to be maintained at substantially the said one potential during operation of said electrical device.

6. In combination, an electrical device having a conductive conduit at one potential and at one temperature, a source of fluid at another potential and at another temperature, a heat exchange device having distinct passages including a passage connected with said conduit, and an insulating conduit for connecting another of said passages of said heat exchange device with said source.

7. In combination, an electrical device having a conductive conduit at one potential and at one temperature, a source of fluid at another potential and at another temperature a heat exchange device having distinct passages including a passage connected with said conduit, an insulating conduit for connecting another of said passages of said heat exchange device with said source, an electrode penetrating within said insulating conduit at a point intermediate the length thereof, and means for connecting said electrode with the first said conduit.

8. In combination, an electrical device having a conduit for the flow of fluid therethrough, a heat exchanger forming a second conduit, insulating means for serially connecting said conduits, means for circulating fluid of material conductivity through said conduits, a third conduit in said heat exchanger in heat exchanging relation with the second said conduit, a source of fluid of material conductivity connected with the third said conduit in insulated relation therewith for the supply of fluid thereto, and means for conductively connecting the first said conduit with the second said conduit.

9. In combination, an electrical device having a conduit at one potential for the flow of fluid therethrough, a heat exchanger forming a second conduit, insulating means for serially connecting said conduits, means for circulating a fluid of material conductivity through said conduits, a third conduit in said heat exchanger in heat exchanging relation with the second said conduit, a source of fluid of material conductivity at another potential, an insulating conduit for connecting said source with the third said conduit for the flow therethrough of fluid from said source, and means for diverting from the fluid within said insulating means the leakage current flowing between the first said conduit and said source by way of the fluid in said insulating conduit.

10. In combination, an electrical device having a conduit for the flow of fluid therethrough, a heat exchanger defining a second and a third conduit in heat exchanging relation, a fluid of relatively high electrical conductivity in the first and second said conduits, means for causing circulation of said fluid between the first and second said conduits, a source of fluid of relatively low electrical conductivity, and insulating means connecting said source with the third said conduit.

11. In combination, an electrical device having a conduit of corrodible material for the flow of fluid therethrough, a heat exchanger defining a second and a third conduit in heat exchanging relation, a body of water in the first and second said conduits and containing material for inhibiting corrosion therein, means for causing circulation of said fluid between the first and second said conduits, a source of fluid of relatively low electrical conductivity, and insulating means connecting said source with the third said conduit.

12. In combination, an electrical device having a conduit of corrodible material for the flow of fluid therethrough, a heat exchanger defining a second and a third conduit in heat exchanging relation, an aqueous solution of an alkaline chromate in the first and second said conduits, means for causing circulation of said fluid between the first and second said conduits, a source of fluid of relatively low electrical conductivity, and insulating means connecting said source with the third said conduit.

13. In combination, an electrical device having a conduit for the flow of a fluid therethrough, storage means for the fluid flowing through said conduit, means for circulating said fluid between said conduit and said storage means, a source of fluid, means connecting said source with said conduit for the flow therethrough of fluid from said source in addition to the flow of circulating fluid, the said connecting means comprising means for substantially insulating said source from said conduit and from the first and second said means.

14. In combination, an electrical device having a conduit for the flow of a fluid therethrough, storage means for the fluid flowing through said conduit, means for circulating said fluid between said conduit and said storage means, a source of fluid, means connecting said source with said conduit for the flow therethrough of fluid from said source in addition to the flow of circulating fluid, the said connecting means comprising an insulating conduit, and an electrode within said insulating conduit and connected with the first said conduit.

15. In combination, an electrical device comprising a conductive conduit at one potential, a second conductive conduit at another potential, an insulating conduit connecting the first and second said conduits for the flow of fluid therebetween, an electrode supported within said insulating conduit at a point intermediate the length thereof, means for controlling the operation of said device, and means comprising an indicating device connected between said electrode and the first said conduit for controlling the operation of said electrical device and for indicating the flow of leakage current between the said electrical device and the second said conduit by way of the first said conduit.

16. In combination, an electric valve comprising a cathode and a conductive casing insulated from said cathode and constituting a conduit for the flow of cooling fluid, a second conduit at a potential lower than the potential of said cathode, an insulating conduit connecting said casing with the second said conduit, electrically conductive fluid within said conduits, and means for causing said casing to be maintained at a positive potential relative to the potential of said cathode and for indicating the flow of leakage current between said valve and the second said conduit by way of said casing.

17. In combination, an electric valve comprising a cathode and a conductive casing insulated from said cathode and constituting a conduit for the flow of cooling fluid, a second conduit at a potential lower than the potential of said cathode, an insulating conduit connecting said casing with the second said conduit, electrically conductive fluid within said conduits, and means for causing said casing to be maintained at a positive potential relative to the potential of said cathode, the said means comprising means for visually indicating and for audibly indicating the flow of leakage current between said valve and the second said conduit by way of said casing.

18. In combination, a source of electric current, an electrical device comprising a conductive conduit at one potential, a second conductive conduit at another potential, an insulating conduit connecting the first and second said conduits for the flow of fluid therebetween, an electrode supported within said insulating conduit at a point intermediate the length thereof, means for connecting said device with said source, and a connection between said electrode and the first said conduit including means responsive to the magnitude of the flow of leakage current through said connection for causing interruption of the supply of current from said source to said device.

19. In combination, a source of electric current, an electrical device comprising a conductive conduit at one potential, a second conductive conduit at another potential, an insulating conduit connecting the first and second said conduits for the flow of fluid therebetween, an electrode supported within said insulating conduit at a point intermediate the length thereof, switch means for connecting said device with said source, and a connection between said electrode and the first said conduit including means responsive to the magnitude of the flow of leakage current through said connection for causing opening of said switch means.

20. In combination, a source of electric current, an electrical device comprising a conductive conduit at one potential, a second conductive conduit at another potential, an insulating conduit connecting the first and second said conduits for the flow of fluid therebetween, an electrode supported within said insulating conduit at a point intermediate the length thereof, means for connecting said device with said source, a connection between said electrode and the first said conduit including a relay connected in parallel with a shunt circuit and responsive to the magnitude of the flow of leakage current through said connection for causing interruption of the supply of current from said source to said device, and means for opening said shunt circuit in response to increase of the magnitude of said leakage current above a predetermined value to accelerate the operation of said relay.

HAROLD WINOGRAD.